(12) United States Patent
Ricci

(10) Patent No.: US 8,959,030 B2
(45) Date of Patent: Feb. 17, 2015

(54) TIMEMINDER FOR PROFESSIONALS

(75) Inventor: Christopher Ricci, Cherry Hills Village, CO (US)

(73) Assignee: Avaya Inc., Basking Ridge, NJ (US)

( * ) Notice: Subject to any disclaimer, the term of this patent is extended or adjusted under 35 U.S.C. 154(b) by 628 days.

(21) Appl. No.: 12/837,815

(22) Filed: Jul. 16, 2010

(65) Prior Publication Data

US 2011/0202439 A1  Aug. 18, 2011

Related U.S. Application Data

(60) Provisional application No. 61/303,800, filed on Feb. 12, 2010, provisional application No. 61/316,026, filed on Mar. 22, 2010.

(51) Int. Cl.
| | | |
|---|---|---|
| G06F 15/02 | (2006.01) | |
| G07C 1/10 | (2006.01) | |
| G06Q 30/04 | (2012.01) | |
| G06Q 10/10 | (2012.01) | |

(52) U.S. Cl.
CPC ............ G06Q 30/04 (2013.01); G06Q 10/1091 (2013.01)
USPC .......................................................... 705/32

(58) Field of Classification Search
USPC .......................................................... 705/32
See application file for complete search history.

(56) References Cited

U.S. PATENT DOCUMENTS

| | | |
|---|---|---|
| RE35,050 E | 10/1995 | Gibbs et al. |
| 5,646,839 A | 7/1997 | Katz |
| 5,727,047 A | 3/1998 | Bentley et al. |
| 5,757,904 A | 5/1998 | Anderson |
| 5,943,406 A | 8/1999 | Leta et al. |
| 5,963,912 A | 10/1999 | Katz |
| 6,044,138 A | 3/2000 | Graham et al. |
| 6,249,570 B1 | 6/2001 | Glowny et al. |
| 6,373,939 B1 | 4/2002 | Reese et al. |
| 6,625,267 B1 | 9/2003 | Graham et al. |
| 6,728,345 B2 | 4/2004 | Glowny et al. |
| 6,760,431 B1 | 7/2004 | Haimi-Cohen |
| 6,792,089 B2 | 9/2004 | Tiliks et al. |
| 6,868,147 B2 | 3/2005 | Wardin et al. |
| 6,885,734 B1 | 4/2005 | Eberle et al. |
| 7,248,678 B2 | 7/2007 | Adams et al. |
| 7,260,198 B1 | 8/2007 | Scott et al. |
| 7,606,856 B2 | 10/2009 | Singh et al. |

(Continued)

FOREIGN PATENT DOCUMENTS

| | | |
|---|---|---|
| CN | 1351459 | 5/2002 |
| CN | 1859557 | 11/2006 |

(Continued)

OTHER PUBLICATIONS

Search Report for UK Patent Application No. GB1102439.5, dated Jun. 8, 2011.

(Continued)

Primary Examiner — Seye Iwarere
(74) Attorney, Agent, or Firm — Sheridan Ross P.C.

(57) ABSTRACT

Embodiments of the present invention are directed to a communication system that provides various automated operations, including searches of public and private resources for third party information, performance of operations to assist a user in response to keyword identification in an audio, text or video stream, and speed dial updates based on calling frequencies to various telephone numbers.

22 Claims, 7 Drawing Sheets

(56) References Cited

U.S. PATENT DOCUMENTS

| | | | |
|---|---|---|---|
| 2002/0021790 A1 | 2/2002 | Corbett et al. | |
| 2002/0056042 A1* | 5/2002 | van der Kaay et al. | 713/178 |
| 2003/0028495 A1* | 2/2003 | Pallante | 705/78 |
| 2003/0061039 A1 | 3/2003 | Levin | |
| 2004/0008828 A1 | 1/2004 | Coles et al. | |
| 2004/0234056 A1 | 11/2004 | Heilmann et al. | |
| 2004/0243431 A1 | 12/2004 | Katz | |
| 2005/0021551 A1* | 1/2005 | Silva et al. | 707/102 |
| 2005/0187839 A1 | 8/2005 | Butera et al. | |
| 2005/0240432 A1* | 10/2005 | Jensen | 705/1 |
| 2006/0004540 A1 | 1/2006 | Hamilton et al. | |
| 2006/0117376 A1 | 6/2006 | Maes | |
| 2006/0129817 A1* | 6/2006 | Borneman et al. | 713/170 |
| 2006/0135128 A1 | 6/2006 | Skoog | |
| 2006/0282465 A1* | 12/2006 | Sharma | 707/104.1 |
| 2006/0287854 A1* | 12/2006 | Smolenski et al. | 704/231 |
| 2007/0140141 A1 | 6/2007 | Frederick | |
| 2007/0218900 A1* | 9/2007 | Abhyanker | 455/435.1 |
| 2008/0109483 A1 | 5/2008 | Yoo et al. | |
| 2008/0120196 A1 | 5/2008 | Reed et al. | |
| 2008/0162454 A1 | 7/2008 | Lundell et al. | |
| 2008/0170676 A1* | 7/2008 | Douma et al. | 379/114.13 |
| 2008/0184028 A1* | 7/2008 | Anson et al. | 713/156 |
| 2008/0301685 A1 | 12/2008 | Thomas et al. | |
| 2009/0036093 A1 | 2/2009 | Graham et al. | |
| 2009/0171700 A1 | 7/2009 | O'Sullivan et al. | |
| 2009/0177691 A1 | 7/2009 | Manfredi et al. | |
| 2009/0193148 A1 | 7/2009 | Jung et al. | |
| 2009/0232289 A1 | 9/2009 | Drucker et al. | |
| 2009/0322476 A1 | 12/2009 | Kassiedass et al. | |
| 2010/0082652 A1 | 4/2010 | Jones et al. | |
| 2010/0235524 A1 | 9/2010 | Klemm et al. | |
| 2010/0246570 A1 | 9/2010 | Chavez et al. | |
| 2010/0250583 A1 | 9/2010 | Klemm et al. | |
| 2011/0047246 A1 | 2/2011 | Frissora et al. | |
| 2011/0072492 A1 | 3/2011 | Mohler et al. | |
| 2011/0078588 A1 | 3/2011 | Klemm et al. | |
| 2011/0113098 A1 | 5/2011 | Walsh et al. | |
| 2012/0095955 A1 | 4/2012 | Koshy | |
| 2013/0179272 A1 | 7/2013 | Bonev et al. | |

FOREIGN PATENT DOCUMENTS

| | | |
|---|---|---|
| EP | 0477854 | 4/1992 |
| EP | 0709996 | 5/1996 |
| EP | 0930761 | 7/1999 |
| EP | 1202540 | 5/2002 |
| GB | 2462030 | 1/2010 |
| JP | 2001-211245 | 8/2001 |
| JP | 2002-297646 | 10/2002 |
| JP | 2004-129061 | 4/2004 |
| JP | 2004-349784 | 12/2004 |
| JP | 2007-304776 | 11/2007 |
| WO | WO 00/59186 | 10/2000 |
| WO | WO 2004/114147 | 12/2004 |
| WO | WO 2005/020106 | 3/2005 |
| WO | WO 2006/096773 | 9/2006 |
| WO | WO 2007/131004 | 11/2007 |
| WO | WO 2008/085585 | 7/2008 |
| WO | WO 2008/124368 | 10/2008 |

OTHER PUBLICATIONS

Background of the Invention for the above-captioned application filed Jul. 16, 2010 (previously provided).

Official Action for United Kingdom Patent Application No. GB1021668.7, dated Apr. 17, 2012 3 pages.

Official Action for United Kingdom Patent Application No. GB1205570.3, dated Apr. 18, 2012 8 pages.

Official Action for United Kingdom Patent Application No. GB1021668.7, dated Aug. 29, 2012 4 pages.

Official Action for U.S. Appl. No. 12/837,762, mailed Sep. 14, 2012 4 pages Restriction Requirement.

Official Action for U.S. Appl. No. 12/837,762, mailed Nov. 2, 2012 13 pages.

U.S. Appl. No. 12/837,762, filed Jul. 16, 2010, Ricci.

Gellersen et al., "Multi-Sensor Context-Awareness in Mobile Devices and Smart Artefacts," Mobile Networks and Applications, Oct. 2002, vol. 7(5), 17 pages.

Communication-mashups, printed from http://www.communication-mashups.com/wiki/Main_Page, page last modified Apr. 15, 2010, 3 pages.

Combined Search and Examination Report for UK Patent Application No. 1021668.7, dated Feb. 22, 2011.

Official Action with English translation for German Patent Application No. 102010054981.9, dated Dec. 21, 2012 19 pages.

Official Action for U.S. Appl. No. 12/837,762, mailed Mar. 15, 2013 14 pages.

Official Action with English Translation for China Patent Application No. 201010624887.3, dated Feb. 22, 2013 17 pages.

Official Action with English Translation for China Patent Application No. 201010624887.3, dated Nov. 15, 2013 10 pages.

Official Action for U.S. Appl. No. 12/837,762, mailed Jan. 10, 2014 12 pages.

Official Action for U.S. Appl. No. 12/837,762, mailed Sep. 9, 2013 15 pages.

Notice of Grant with English Translation for China Patent Application No. 201010624887.3, dated Jun. 12, 2014 5 pages.

Notice of Allowance for U.S. Appl. No. 12/837,762, mailed Jul. 16, 2014 9 pages.

* cited by examiner

TIMEMINDER FOR PROFESSIONALS

CROSS REFERENCE TO RELATED APPLICATION

The present application claims the benefits of U.S. Provisional Application Ser. Nos. 61/303,800, filed Feb. 12, 2010, and 61/316,026, filed Mar. 22, 2010, each of which is incorporated herein by this reference in its entirety.

FIELD

The invention relates generally to communications and particularly to intelligent telecommunication systems.

BACKGROUND

Time tracking for multi-media/multi-modal communications in high-paced professional environments, such as law, accounting, and medicine, can vary between being haphazard based on the user's best recollection of events to a laborious process using a number of disjointed applications. In the case of the former, significant inaccuracy and lost revenue generation potential can be the result. In the case of the latter, the use of the different applications is disruptive to the normal flow of business and, due to the process overhead, reduces the time available to actually generate revenue from value-added activities. One weakness in all prior art is a failure to consider the complexities of multi-media/modal communications and related Internet and paid provider search sessions Examples of paid provider search sessions include LexisNexis™, Westlaw™, and Delphion™, each of which offers a searchable archive of content from newspapers, magazines, legal documents and other printed public sources. Such search sessions are contextually related to a customer matter and are therefore revenue generating.

In designing an automatic logging system, there are a number of considerations. It should be a versatile and intelligent method of logging any and all communications, whether voice-, text-, and/or video-enabled, and searches, without incurring significant overhead, to provide accurate billing results. It should be done so that the user does not have to be resident, physically or logically, in the enterprise premises, on the enterprise network, or otherwise using a device that is dedicated to the business of the enterprise. It should maintain accurate timing information by identifying intelligently and accurately starting and stopping points for the service being monitored.

SUMMARY

These and other needs are addressed by the various embodiments and configurations of the present invention. The present invention is directed generally to an intelligent communication system that monitors user actions and performs operations responsive to the monitored actions.

In a first embodiment, a system and method are provided that perform the following steps/operations:

(a) monitoring, in substantial real time, a collection of actions by a user;

(b) based on the monitoring step, determining a subject identifier associated with a monitored action; and (c) generating at least part of a billing entry based on the subject identifier and monitored action.

The actions monitored and logged by system and method include not only communications and searches but also electronic document creation and edition, electronic document review, file or record access or retrieval, and the like. The system and method can provide output to automatic billing applications and/or manual billing or other business processes via reports and/or secondary communications sessions. In the case of handling several matters for a big client, differentiation between matters can be done automatically, via a drop down menu or the like or, alternatively, via period voice and/or text prompts to allow the communicating party to indicate the matter. The output could be another communication, such as an email to the billing department, or some sort of report formatted to suit an automatic billing application. The output could also be a derivative work combining a communication summary or recording with billing information.

Timestamping and time interval computation can be done by many techniques. One technique is to use of known "rich presence" technology, which can start, stop and transition billing to account for breaks, distractions, sudden topical changes to other matters, changes between communications and searches, changes to different communications media, and the like to make sure that accountability and justification for the bill is provided.

These and other improvements to the art are taught below as may be apparent to one schooled in the art of enterprise applications.

The present invention can provide a number of advantages depending on the particular configuration. By way of example, it can be a versatile and intelligent method and system of logging any and all communications, whether voice-, text-, and/or video-enabled and whether in network (or in enterprise) or off-network (or out of enterprise) communications, and searches, without incurring significant overhead, to provide accurate billing results. It can be done so that the user does not have to be resident, physically or logically, in the enterprise premises, on the enterprise network, or otherwise using a device that is dedicated to the business of the enterprise. It can maintain accurate timing information by identifying intelligently and accurately starting and stopping points for the service being monitored.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "call log" refers to a collection, or list, of inbound and/or outbound calls. A call is typically described by timestamp (e.g., date and time of day of call set up, termination, or receipt), call duration, called number, calling number, callee identity, and/or caller identity.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "contact" refers to any voice, text, and/or video electronic communication, such as a voice call, E-mail, instant message, text chat, VoIP call, and the like.

The term "customer" or "client" denotes a party patronizing, serviced by, or otherwise doing business with the enterprise The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The terms "instant message" and "instant messaging" refer to a form of real-time text communication between two or more people, typically based on typed text. The instant message is conveyed by an instant messaging program offered by a service, such as AOL™, MSN Messenger™, Yahoo! Messenger™, Live Messenger™, and Apple's iChat™. Generally included in the instant messaging software is the ability to see the presence of another party; that is, the ability to see whether a chosen friend, co-worker or other selected person (known as a "buddy") is online and connected through the selected service. Instant messaging differs from ordinary e-mail in the immediacy of the message exchange and also makes a continued exchange simpler than sending e-mail back and forth. Instant messaging, unlike e-mail, is also generally stateless. Most exchanges are text-only, though some services now allow voice messaging, file sharing and even video chat (when both users have cameras). For instant messaging to work, both users must be online at the same time and the intended recipient must be willing to accept instant messages. An attempt to send an instant message to someone who is not online (or is offline), or who is not willing to accept instant messages, will result in a notification that the transmission cannot be completed. If the online software is set to accept instant messages, it alerts the recipient with a distinctive sound and provides a window that collectively indicates that an instant message has arrived. The window allows the recipient to accept or reject the incoming instant message. An instant message session is deemed to disconnect, or be disconnected, when the user goes offline, refuses to accept an instant message, or is suspended by the user failing to respond to an instant message after a predetermined period of time after an instant message is sent and/or received. An instant message session is deemed to be reconnected (or a call-back deemed to occur) when the user resumes the instant messaging session, such as by responding to an outstanding instant message.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "presence information" refers to any information associated with a network node and/or endpoint device, such as a communication device, that is in turn associated with a person or identity. Presence information can indicate user status (e.g., online or offline), user availability (e.g., available, busy, on the phone, or out to lunch), user's desired contact means (e.g., instant messaging, circuit-switched telephone, packet-switched telephone, cell phone, pager, etc.) that may vary by contactor identity and/or contact time, and at what endpoint a contactor is most likely to reach successfully the presence service subscriber. Presence information can span a number of different communication channels. The aggregated view of a user's presence (that is, the availability across all of an individual's SIP-enabled devices) is called Multiple Points of Presence or MPOP. Examples of information useful in determining a user's presence and availability include information regarding the accessibility of the endpoint device, the recency of use of the endpoint device by the person, recency of authentication by the person to a network component, recency of registration of an endpoint device, an endpoint publishing presence information, SUBSCRIPTION requests generated by a user agent in the user's endpoint device, geographical location of the user using mobile device location information, scheduled activities on the user's calendar, indications whether or not a user has been reading or sending email, and an indication whether the user's email application has an out of office setting. Present information can be, for example, the electronic address of a device at which the service subscriber is currently deemed to be present and/or available.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "speed dial" refers to a function available on many telephone systems allowing the user to place a call by pressing a reduced number of keys (or speed dial key set) compared to the number of keys pressed when dialing the full number. This function is particularly useful for phone users who dial certain numbers on a regular basis. In most cases, the user stores these numbers in the phone's memory for future use. The speed dial numbers are usually accessed by pressing a pre-determined key or keys on the phone, followed by a one or two-digit code which the user assigns to each number; however for ease of use, on many systems a call may be placed by pressing and holding one key on the numeric keypad.

The term "synchronized" means, in the context of databases, maintaining selected fields in the records of one database temporally up to date with respect to changes in the information stored, by the other database, in the selected or equivalent fields.

The term "subject identifier" refers to a client identifier or client number, customer identifier or number, file identifier or number, record identifier or number, matter identifier or number, invoice identifier or number, case identifier or number, and other like unique or substantially unique codes, whether numeric, alphabetical, or alphanumeric.

The term "VoIP" refers to a family of transmission technologies for delivering packetized voice communications over IP networks such as the Internet or other packet-switched networks, rather than the public switched telephone network (PSTN). Other terms frequently encountered and synonymous with VoIP are IP telephony, Internet telephony, voice over broadband (VoBB), broadband telephony, and broadband phone. Common protocols for VoIP include H.323 and the Session Initiation Protocol.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The disclosure, in various embodiments, provides a system and method to perform a variety of operations discussed in more detail below. One operation is to associate, or link, a communication device (particularly a telephone) with one or more computers and/or processors in other devices. An application is placed on the communication device that establishes, via rules or policies, circumstances under which a contact to an internal or external server is required. The contacted server can perform tasks, such as perform searches on external and/or internal data repositories, collect text and/or voice mail messages, and present the located or collected information and messages to a user. Another operation is to perform automatic tracking and billing of a user's activities, such as correlating automatically a contact, independent of media or mode, with a customer or client record, such as a list of client matters or file numbers, and interacting with an enterprise billing system to create or edit a time entry for the contact. Another operation is to provide, from the voice communication device or desktop appliance, a Dictaphone application. The application can use the quality of the phone handset to record dictation. Another operation is to create virtual conversation records and catalog conversations. Another operation is to receive, from a user, voice annotation to permit the user to capture the intent and specifics before, during or after a voice contact or when reviewing a document. Another operation is to propagate contact information to the voice communication device in response to calendar prompts or interrupts. Another operation is to update automatically speed dial keys on the user's voice communication device, with or without user input.

The various embodiments and configurations in this disclosure will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any application in which it is desirable to collect and associate related and temporally changing multimedia information for presentation to a user.

Figure 1:
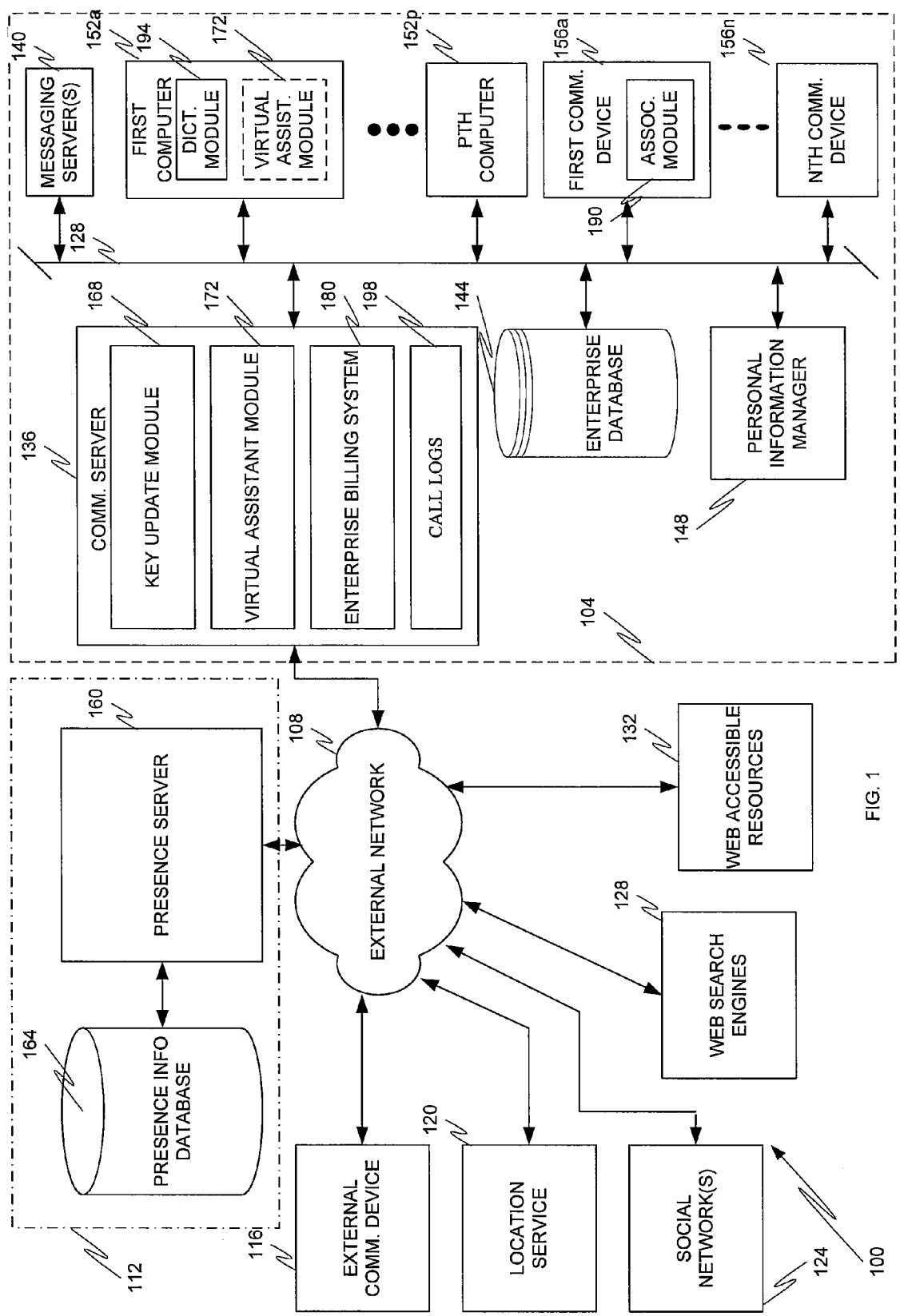
FIG. 1 is a block diagram of a network architecture according to an embodiment.

FIG. 1 depicts an architecture 100 according to an embodiment. Referring to FIG. 1, an enterprise network 104 is in communication, via packet-switched (typically untrusted or unsecure or public) external network 108, with a presence service 112, one or more external communication device(s) 116, a location service 120, a social network 124, web search engine(s) 128, and other web-accessible resources 132.

The external network 108 is preferably a public packet-switched and/or circuit-switched network or set of networks. In one configuration, the external network 108 is a public network supporting the TCP/IP suite of protocols.

The presence service 112 includes a presence server 160 and an associated presence information database 164 that may or may not be operated by (or be external to) the enterprise network 104. The presence server 160 and presence information database 164 collectively track the presence and/or availability of presence service subscribers and/or their communication devices and provide, to requesting entities, current presence information respecting selected presence service subscribers. As will be appreciated, when the presence service 112 is external to the enterprise the presence service subscribers are different from the enterprise subscribers.

The external communication device(s) 116 can be any suitable circuit- or packet-switched or digital (e.g., TDM-enabled) communication device. Examples include wired and wireless telephones, cellular phones, Personal Digital Assistants or PDAs, Personal Computers or PCs, laptops, packet-based H.320 video phones and conferencing units, packet-based voice messaging and response units, peer-topeer based communication devices, and packet-based traditional computer telephony adjuncts.

The location service 120 comprises one or more servers for locating, in response to search queries, information publicly available on the external network 108. Examples of such information include personal or business profiles, telephone numbers, physical addresses, contact addresses, and other personal and business information. The location service 120 can be controlled by or independent of the enterprise. In the latter case, the location service 120 can be a paid or free service. The operation of the location service 120 is discussed in more detail below.

The social network 124 can be any social internetworking service, including those defined above.

The web search engines 128 search for information on the external network 108, including information provided by web accessible resources 132. The information may consist of web pages, images, information and other types of files. Some search engines also mine data available in databases or open directories. Unlike web directories, which are maintained by human editors, search engines operate algorithmically or are a mixture of algorithmic and human input. Web engines typically operate through the sequential operations of web crawling, indexing, and searching. Exemplary search engines include Yahoo!™, Google™, Internet Explorer™, Bing™, Baidu™, AOL™, and Netscape™ search engines.

The web-accessible resources 132 refer to any indexed or otherwise searchable information or services available on the external network 108. Web-accessible resources 132 include information available on web pages, blogs, RSS feeds, and the like.

The internal network 104 includes a communications server 136, a (unified) messaging server 140, an enterprise database 144, a personal information manager 148, a plurality of first, second, . . . pth personal computers 152*a-p*, and a plurality of internal first, second, . . . nth communications devices 156*a-n*, interconnected by an (trusted or secure or private) internal network 128. The internal network 128 can be secured from intrusion by untrusted parties by a gateway (not shown) and/or firewall (not shown).

The communications server 136 can include a PBX, an enterprise switch, an enterprise server, or other type of telecommunications system switch or server. The communication server 136 is preferably configured to execute telecommunication applications such as the suite of MultiVantage™ or Aura™ applications of Avaya, Inc., including Communication Manager™, Aura Communication Manager™, Avaya IP Office™, and MultiVantage Express™.

The (unified) messaging server 140 may provide features for integrating real-time voice, video and text communication services, such as instant messaging, chat, telephony (including IP telephony), and video conferencing, with non real-time communication services, such as voice mail, e-mail, SMS, and fax The personal information manager 148 contains, organizes and/or synchronizes subscriber personal information, such as contact information or address books, electronic calendars, personal notes, lists (e.g., task lists), reminders, text message archives, RSS/Atom feeds, alerts, and project management. An exemplary personal information manager 148 is Outlook™ by Microsoft, Inc. An electronic calendar, as will be appreciated, includes scheduled events indexed by date and time.

The first, second, . . . pth computers 152*a-p* can be any computational device, with personal computers and laptops being illustrative.

Included in the memory of the first, second, . . . pth computers 152*a-p* is a dictaphone module 194 and, optionally, a virtual assistant module 172 (discussed below). The dictaphone module 194, which can be on a user's computer, uses the microphone on the user's communication device (e.g., the telephone handset) to record a high quality dictation and the speaker on the communication device (or telephone handset) to play back the dictation. Voice recognition, by the dictaphone module 194, which, in one configuration, is a speech-to-text application on the first, second, . . . pth computers 152*a-p* associated with the user, can translate most of the recording to text. A back up recording, which is preferably compressed by a suitable algorithm such as MP3, can be shared, with the user or an outsourced transcription service, to improve the quality and/or verify the accuracy of the recording. Integration with the messaging server(s) 140 allows the user to push voicemails to be transcribed by the dictaphone module 194 as well as record messages for oneself to be transcribed by the dictaphone module 194. The dictaphone module 194 can generate, for the virtual assistant module 172, an excerpt to be included in a billing entry. The user can use the dictaphone module 194 and the voice communication device to generate a short contact summary as a reminder of what was discussed. The summary is linked or appended to a recording of the contact session for later reference. The dictaphone module 194 can interface with the personal information manager 148 and other task management applications to automatically schedule a follow-up reminder to record the contact session summary when the professional does not have time immediately following a contact.

The first, second, . . . nth communication devices 156*a-n* can be similar to the external communication devices 116. In some embodiments, the communication devices 156*a-n* may be IP-enabled, SIP-enabled, digital, and/or analog devices. Examples of suitable modified IP telephones include the 1600™, 2400™, 4600™, 5400™, 5600™ 9600™, 9620™, 9630™, 9640™, 9640G™ 9650™, and Quick Edition™ telephones, IP wireless telephones (such as Avaya Inc.'s IP DECT™ phones), video phones (such as Avaya Inc.'s Videphone™), and softphones of Avaya, Inc. Other types of suitable communication devices 156*a-n* include, without limitation, cellular phones, analog phones, digital phones, etc.

The enterprise database 144 includes enterprise subscriber information, such as name, job title, electronic address information (e.g., telephone number, email address, instant messaging handle, direct dial extension, and the like), subscriber contact lists (e.g., contact name and electronic address information), other employee records, search results, and the like. In one configuration, the enterprise database 144 is configured in accordance with the Lightweight Directory Access Protocol.

Included in the memory of the first, second, . . . nth communication devices 156*a-n* is an association module 190. The association module 190 associates or links a communication device (particularly a telephone) with one or more computers and/or processors in other devices, such as the communication server 136, location service 120, messaging server(s) 140, personal information manager 148, and first, second, . . . pth computers 152*a-p* (collectively "information servers"). The association module 190 establishes, via rules or policies, circumstances under which a search request to an internal or external information server, for instance, is required. Different stimuli and applicable rules and policies will typically direct the request to different sets of information servers. The information servers may operate in accordance with a Services Oriented Architecture. For example, the association module 190 detects a stimuli that requires it to contact a messaging server 140 to locate any relevant uni- or multimedia messages. If the messaging server 140 were to be hosted on the external network 108, the association module 190 would directly contact the messaging server 140 at that address. If the association module 190 needs to contact a corresponding first computer 152*a*, the association module 190 contacts a compatible module on the first computer 152*a* to obtain desired information or effectuate a desired action. Linkage between information servers that may provide a portion of the functionality can be via one or more communication protocols, such as extended markup language ("XML"), voice extended markup language ("VXML"), simple object access protocol ("SOAP"), and the like. Overall coordination between information servers where a plurality of different types of contact information is required, for example, can be done by distributed modules or, alternatively, on a centralized basis.

Included in the memory of the communication server 136 (or located in one or more other network nodes on the external and/or internal networks 108 and 128) are an enterprise billing system 180, a virtual assistant module 172, the key update module 168, and call logs 198. As will be appreciated, the billing system 180 and/or virtual assistant and/or key update modules 168 and 172 can be located alternatively, partially, or in combination, within the internal network 128, in memories of the first, second, . . . pth computers 152*a-p* and/or of the first, second, . . . nth communication devices 156*a-n* and, within the external network 108, on one or more nodes.

The enterprise billing system 180 can be any enterprise billing application. Examples of billing applications include Quickbooks™, LexisNexis™, ADC Legal Systems™, PerfectLaw™, Abacus, Reliable Legal Billing™, RTG Legal Time and Billing™, Serengeti Tracker™, TimeSolv Legal, Elite Legal Time and Billing™, Omega Legalvx, EHR Billing System™, Bill4Time™, Medical Billing System™, and like systems.

The virtual assistant module 172 can perform a number of operations alone or in combination (e.g., serially and/or in parallel).

A first exemplary operation is to perform information searches of resources on the internal and/or external networks 128 and 108, respectively, to identify information associated with a selected third party for presentation to a user. The enterprise resources searched, though not part of the internal network 128, may be accessed using wireless protocols, such as Bluetooth. For example, data on an unsynchronized cellular personal digital assistant or telephone can be accessed by the user's corresponding computer through an open wireless protocol.

The third party information to be located by the search can vary. Such information includes electronic addresses, names, matter or subject names, matter or subject identification codes or identifiers (e.g., customer or client numbers, invoice numbers, file numbers, and the like), personal or business profiles (e.g., family information, hobbies and other interests, employment information, physical (home or business) addresses, educational background, personal and business affiliations, and the like), and/or other types of third party information.

The searches may be any type of search methodology, including Boolean and/or hierarchical searches, viral searches, and the like. The virtual assistant module 172 can search any file types, including HTML and non-HTML file types. In one configuration, a viral search is performed that considers indicia of trust with the resources searched. For example, the virtual assistant module 172 can determine from internal network resources that the user (an enterprise subscriber) has personal or business connections with person X. The virtual assistant module 172 further determines, from a social network profile, that person X knows person Y, the person of interest in the search. The virtual assistant module 172, having determined that a trusted relationship exists, would contact, by a text message such as an instant message or e-mail, person X, requesting the information of interest about person Y and indicating the nature of the trusted relationship through which this information is sought. Different levels of viral search can be used for different levels of trusted relationship. For example, more activities would be taken for a higher level of trust than for a lower level of trust or vice versa. A higher level of trust, for instance, might send an instant message to the trusted third party and provide the user with a pop up indicating the user should also call the trusted third party for the information of interest. A lower level of trust might send simply an email to the trusted third party seeking the information of interest.

By way of illustration, before, during, or after a contact is established or set up between the first communication device 156*a* of a first user and an external communication device 116 of a third party, the association module 190, or alternatively virtual assistant module 172, identifies the third party telephone number of the external communication device 116 and attempts to determine the identity of the third party. This may initially be done locally on the internal network 128, such as by searching a local contact list on the first communication device 156*a*, an email log or directory, an electronic calendar, and the like. If the search is not successful, the association module 190 directs a search request to the virtual assistant module 172, which first searches pertinent records on the internal network 128, including the enterprise database 144, records maintained by the personal information manager 148, records maintained by the communication server 136 (e.g., call logs), and records maintained by the messaging server(s) 140. If the requisite information is still not found, the virtual assistant module 172 sends a search request to the location service 120. The location service 120 interacts with the social network(s) 124 (e.g., LinkedIn, Facebook, etc.), presence service 112, web search engines 128, and directly or indirectly with the web accessible resources 132 for the requested information. For instance, the location service 120 can do a reverse number lookup on an electronic phone book (e.g., Whitepages.com). The information collected by the location service 120 on the external network 108 is returned to the virtual assistant module 172. The information, located on the external and internal networks, is collected by the virtual assistant module 172 and provided, via the association module 190 to the first user on the first communication device 156*a* and/or, via the virtual assistant module 172, on the first computer 152*a* associated with the first user. Alternatively or additionally, the virtual assistant module 172 caches the collected information and/or causes the collected information to update data repositories, such as locally stored contact lists, client or customer records, billing entries, and the like.

A second exemplary operation is to perform call eavesdropping and record or otherwise analyze (e.g., by keyword identification), in substantial real time, a voice conversation between subscribers or between a subscriber and a nonsubscriber. This is achieved by bridging, or connecting, the virtual assistant module 172 onto a contact. The virtual assistant module 172 can be joined for all or only part of the contact. The virtual assistant module 172 receives and records, via the bridge, all or part of one or more audio, text, and/or video streams associated with the contact. An automatic speech-to-text conversion may be performed by the virtual assistant module 172 to form a searchable text transcript. The virtual assistant module 172 can "listen" to the first part of the conversation, for example, when it is typical for a caller to state the purpose of the call. When the virtual assistant module 172 identifies keywords, such as "contract", "patent", etc., for instance, the virtual assistant module 172 can open the actual files most closely associated with that user and those keywords, thereby choosing the most context appropriate files. In another example, the virtual assistant module 172 can, based on keyword recognition, guess a next activity by the user and proactively retrieve documents and/or initiate a communication. For instance, when a user says "e-mail" in connection with a personal or business name, the virtual assistant module 172 can automatically open an e-mail display sub-segment, containing partially populated fields to reflect identified keywords, including the email address of the named party. In another example, when a user says "schedule a meeting" or a similar phrase, the virtual assistant module 172 would automatically create a new partially populated electronic calendar entry containing the e-mail address of the other participant to the contact. Whether or not to activate this operation is a function of user input, the subject identifier or code, the contacted or contacting number, the contacted or contacting party identity, the electronic calendar entry description, and the like.

A third exemplary operation is to perform automatic tracking and billing, such as correlating automatically a contact, independent of media or mode, with a customer or client record, such as a list of client matters or file numbers, and interacting with the enterprise billing system 180 to create a new time entry for and/or an existing time entry to reflect the contact. This operation can automatically log a real time or non-real time contact or communication session, particularly a real time contact such as a two-party or three or more party conference call or instant messaging session, based on contact information or address, such as an inbound or outbound contact phone number, e-mail address, instant message handle, Address of Record ("AOR"), electronic alias in a database, or the like for subsequent processing as a time entry (which includes an automatically created description and detected time duration) by the enterprise billing system 180. As will be appreciated, the phone number is typically not an enterprise administered or controlled number. The third operation includes the ability, based on an electronic address (e.g., telephone number, instant message handle, e-mail address, web browsed universal resource locator or URL), called or calling party identifier, and/or keyword identification, such as in a text equivalent of the conversation, and whether the contact is real time or non-real time, to access and/or generate a set of potentially relevant matters, invoice or order numbers, or other subjects for presentation, by audio, text, and/or video, to the user. The user, such as an attorney or other professional, customer service representative, and the like, can select, from the set by, for example, a drop down menu, the specific subject prior to, during, or after a contact. The virtual assistant module 172 can forward the identities of the parties to the contact, the subject identifier, and duration to the billing system 180. The billing system 180 generates or updates a time entry, associated with the subject identifier, based on the information, which time entry includes an automatically generated full or partial description (e.g., "phone conference between parties X and Y regarding [case name]") and duration, which duration may be rounded up or down to the nearest tenth of the hour. In short in professional billing applications, the virtual assistant module 172 takes contextual groupings of work and determines, based on an electronic contact or file address or any other subject identifier, who should be billed for the work.

As will be appreciated, the third operation is not limited to contacts and contact sessions but is applicable to automated tracking and logging of activities generally. In one configuration, the activity of the user is tracked, both as to subject identifier and duration, and the tracked activity entered automatically into the billing system 180. Based on this information, the virtual assistant module 172 can determine what activities the user is performing as a function of time and the matter to which the tracked activity pertains. The virtual assistant module 172 can also track what billable services are being accessed by the user, such as subscription or use-based search services (e.g., Lexis Nexis™, Westlaw™, and Delphion™), and automatically associate the charge with the subject identifier. Using this information, the virtual assistant module 172 can interact with the billing system 180 to create or edit a suitable time entry for each tracked activity. Separate or cumulative time entries can be entered where multiple activities performed at different discrete intervals pertain to a common subject identifier. Not only does this extend automated tracking and billing to many media and modes but also it allows complex transitions between communications media/modes to be accurately tracked for proper billing and extends automated tracking and billing to billable searches.

A fourth exemplary operation is to create virtual conversation records and catalog conversations. The recorded communications in the session, for example, can be key word searched, tagged, timestamped, and linked or otherwise associated with the subject matter identifier. The key words can be inputted, before, after or during the contact, by the user or be based on information flagged in the corresponding subject description or electronic calendar entry. Using the keywords or tags, a summary may be prepared by the virtual assistant module 172. The virtual assistant module 172 can automatically email the transcript to selected individuals, such as those on a distribution list. The tags may be used to trigger alerts, facilitate transcript searching, and/or initiate searches for related information, such as documents, emails, instant messages, and the like.

A fifth exemplary operation is to receive, from a user and by the dictaphone module 194, a voice annotation (e.g., summary) to permit the user to record orally the discussion or session intent, discussion or session specifics, and other desired information before, during or after a contact session or when reviewing a document. By way of example, a summary of a telephone conversation is converted into a text equivalent, and the telephone conversation itself recorded, converted into a text equivalent, key word searched using terms received from the user, discerned from the subject matter description(s) associated with a selected subject matter, and/or identified in the summary, the occurrences of the key words tagged, and the summary and recorded telephone conversation saved in a common file or under a common file address. In one configuration, the text equivalent is in a form editable by a word processing application and can be emailed to the user or forwarded to the user's corresponding computer.

A sixth exemplary operation is to propagate contact information to the communication device (particularly a telephone) in response to calendar prompts or interrupts. The virtual assistant module 172 can also give an audio and/or visual warning regarding appointments based on user defined alerts. The virtual assistant module 172 can query the various schedules of members of a conference call, for example, and interact with the personal information manager 148 to create meeting invites based on contact attendance.

A seventh exemplary operation is to retrieve a display segment (e.g., window) for the other party to the contact session. Each party or type of party has a potentially different and unique display segment. When the inbound or outbound contact is set up, the virtual assistant module 172 identifies the corresponding display segment for the other party and presents it to the user either by way of the user's communication device 156 or computer 152. Sub-segment displays can be associated with objects other than contact information, such as electronic calendar items; thus, when an event is scheduled to occur, the virtual assistant module 172 identifies the display segment(s) for the parties involved in the calendared event and presents the display segment(s) to the user. In one configuration, human assistants, such as paralegals, associates, and secretarial assistants, can pre-populate items or fields to be reviewed on a contact, which are then pre-loaded when the contact session commences.

Figure 4:
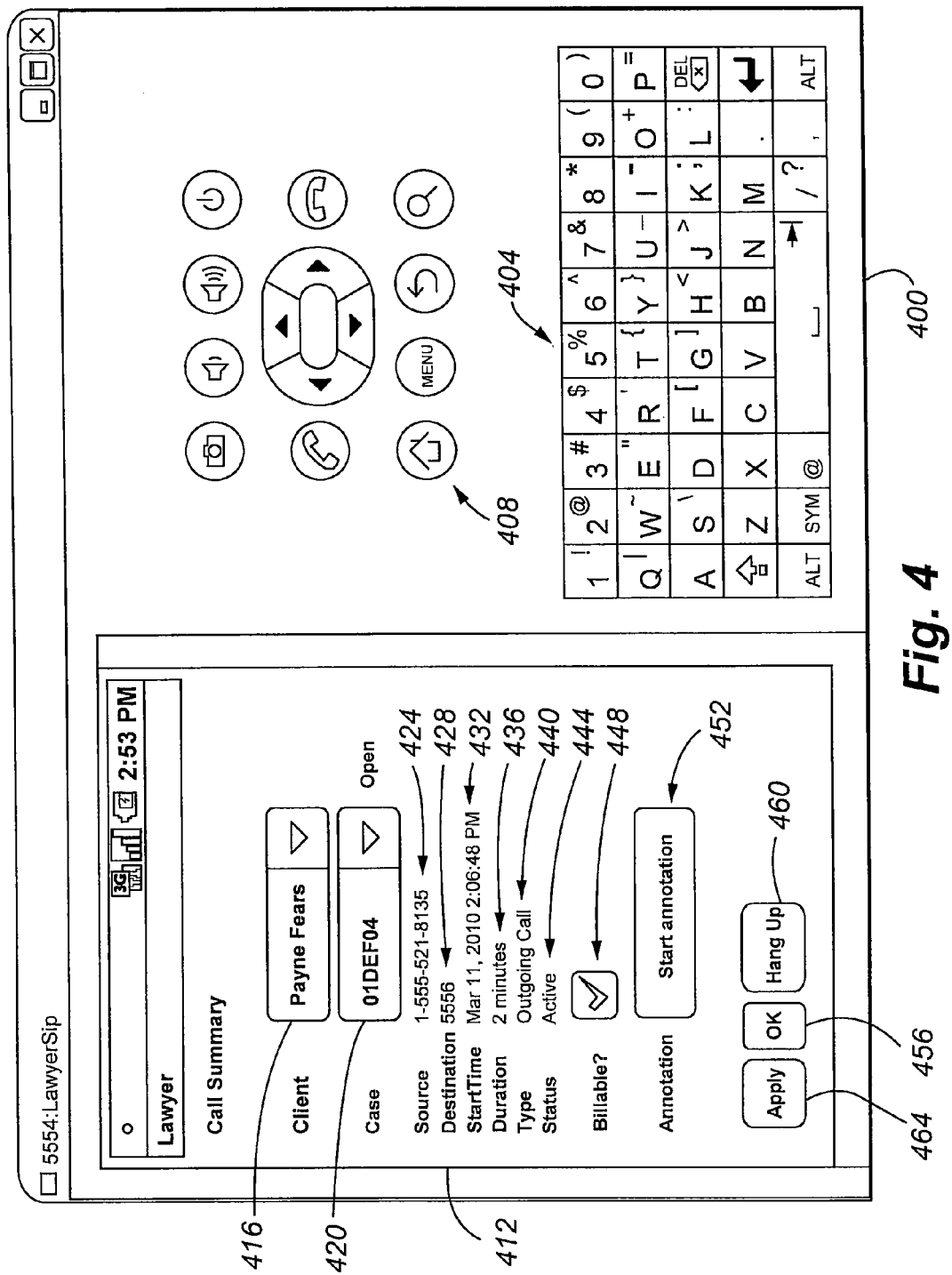
FIG. 4 is a screen shot illustrating a graphical user interface according to an embodiment.

FIG. 4 is a display segment 400 of an interactive computer display according to an embodiment. The display segment 400 may be presented to the user by the corresponding first, second, . . . pth computer 152a-p and/or first, second, . . . nth communication device 156a-n. The display segment 400 includes a key pad 404, application control icons 408, and display sub-segment 412 configured for a legal professional as the user. The display sub-segment 412 includes the client name 416 (which may be selected by the user from a drop down menu), case name 420 (which may be selected by the user from a drop down menu), third party electronic address 424, contacted enterprise network electronic address 428, contact start time 432, contact duration 436, contact type 440 (e.g., outgoing contact, incoming contact, multi-party (≥3) party conference call, etc.), contact status 444 (e.g., active or disconnected), billable 448 (e.g., yes or no), start annotation icon 452 (to activate the dictaphone module 194), apply icon 464 to enter the displayed information into the billing system 180, OK icon 456 to accept the displayed information for storage (e.g., to link or append the displayed information and/or transcript to a recording of the contact), and hang up icon 460 to disconnect the contact. As will be appreciated, the various fields in the display sub-segment can be configured to be edited by the user.

The operations of the virtual assistant module 172 and association module 190 will now be described with reference to FIGS. 1-3.

In step 200, the association module 190 in a first communication device 156a detects a stimulus. The stimulus may be the press of a key, selection of an icon, receipt of an oral command, input of a destination electronic address, receipt of an incoming contact, and the like. The key press, icon selection, or oral command can request a search, indicate a search type, and provide search term(s), such as an electronic address, third party name, business name, physical address associated with a third party or business, subject identifier or code, and the like. The search type can vary based on a number of parameters, including one or more of a number of hierarchical layers searched, number of viral searched branches pursued, search duration, resources searched, timing of search, number of computer determined synonyms (e.g., in semantic searches), and information desired. The desired information to locate in the search is typically predetermined and varies depending on the command received and/or type of or the specific information provided by the user. For example, when the information received is a destination telephone number of a business contact, the desired information is business related. When the information received is a destination telephone number of a non-business acquaintance, no information is desired and no search is performed. The association module 190 searches local data repositories, such as contact lists, electronic calendar entries (to determine if the contact was scheduled and, if so, with whom, via what numbers, and/or with respect to what subject or subject identifier), and other pertinent files and directories, stored by the communication device, for the desired information. If, for example, the user is in professional services, a list of associated client, matter, or other subject codes can be brought up for the identified electronic address or caller identifier. If the identified electronic address or caller identifier has a file or directory associated with it, either by name, client code, or otherwise, the file or directory can be opened by the virtual assistant module 172 in the communication server 136, corresponding communication device 156, and/or corresponding computer.

If the search term(s) are not located in a stored repository on the communication device (e.g., the dialed number or caller identifier is not found on a locally stored contact list), the association module 190, in step 204, contacts one or more predetermined electronic address(es), which, for instance, can be the MAC or IP address of the user's associated first computer 152a and/or the communication server 136 and provides the search term(s) (e.g., dialed number and/or caller identifier) and, optionally, a description of the desired information. In one configuration, the virtual assistant module 172 determines, based on the search term(s) and/or search type, received from the association module 190 and indicated by the user, the desired information.

In step 208, the virtual assistant module 172 in the communication server 136, communication device 156, and/or computer 152 receives an acknowledgement from the virtual assistant module 172 in the communication server 136 and awaits the search completion signal and search results.

Figure 3A:
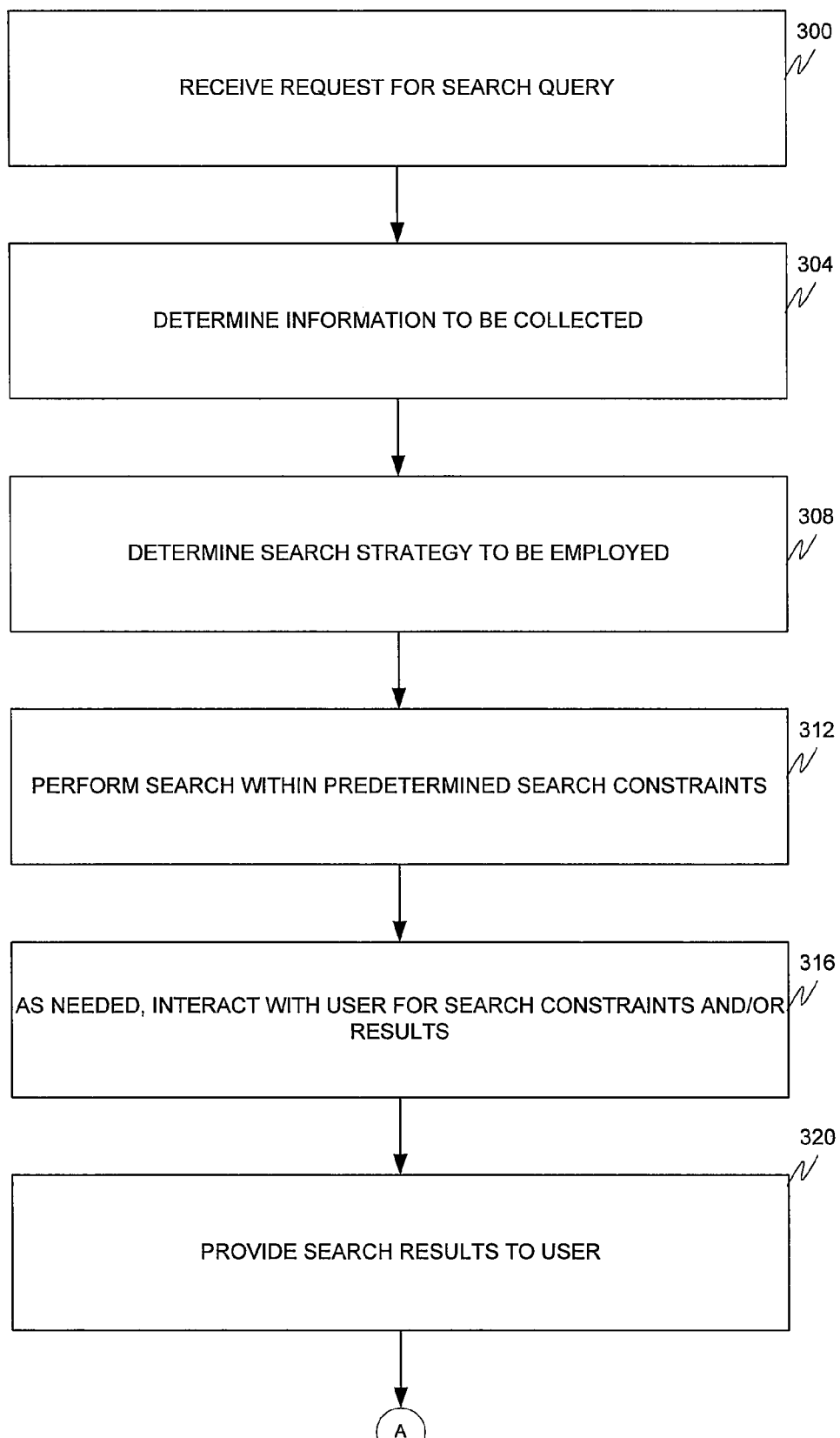
FIGS. 3A-B depict a flow chart according to an embodiment.

Referring now to FIG. 3A, the virtual assistant module 172 in the communication server 136, communication device 156, and/or computer 152, in step 300, receives the search request or notification, such as from the user.

In step 304, the virtual assistant module 172 in the communication server 136, communication device 156, and/or computer 152 determines the information to be collected. As noted, the information may be determined based on the contents of the notification received from the association module 190. It can be determined based on a search type indicator received from the association module 190. It can be determined based on a predetermined partially populated template, such as an ecard or vcard, comprising multiple information fields. Other variations will be evident to one of ordinary skill in the art.

In step 308, the virtual assistant module 172 in the communication server 136, communication device 156, and/or computer 152 determines the search strategy to be employed. Search strategy is generally a combination of the search term structure and resources to be searched. The search strategy can be, for example, a function of the user command, search type requested, relevant subject identifier and/or code, and the like. Search structure refers to the particular combination of search terms and Boolean modifiers. Resources to be searched include, for example, searching internal network resources only, searching external network resources only, and searching a combination of internal and external network resources. Within these possibilities, the identities of and ordering of the various resources to be searched can be specified. In one illustration, the local data repositories on the corresponding communication device 156 are searched first, the local data repositories on the corresponding computer 152 second, the other resources on the internal network 128 third, and the resources on the external network 108 fourth.

In step 312, the virtual assistant module 172 in the communication server 136, communication device 156, and/or computer 152 performs the search within the determined search constraints. The virtual assistant module 172, as discussed above, may search internal network resources first followed by external resources. The virtual assistant module 172 might truncate or terminate the search or request user permission to continue the search after passage of a certain period of time. Searches of external resources are typically performed by the location service 120. Due to the potential use of confidential or sensitive information in the search query, different search strategies (e.g., different search terms) can be used by the virtual assistant module 172 with respect to internal network resources and by the location service 120 with respect to external network resources. A search term filtration operation can be performed by the virtual assistant module 172, using predetermined policies and rules, to prevent potential publication of confidential or sensitive information on the external network 108. Alternatively or additionally, a virtual private network tunnel or other secured signaling pathway can be set up between the enterprise network 104 and the location service 112 to protect confidential or sensitive information.

In step 316, the virtual assistant module 172 in the communication server 136, communication device 156, and/or computer 152, as needed, interacts with the user, for additional search constraints and/or acceptability of results.

In step 320, the virtual assistant module 172 in the communication server 136 forwards the completed search results to the communication device 156 and/or computer 152 for presentation of the results to the user.

Figure 2:
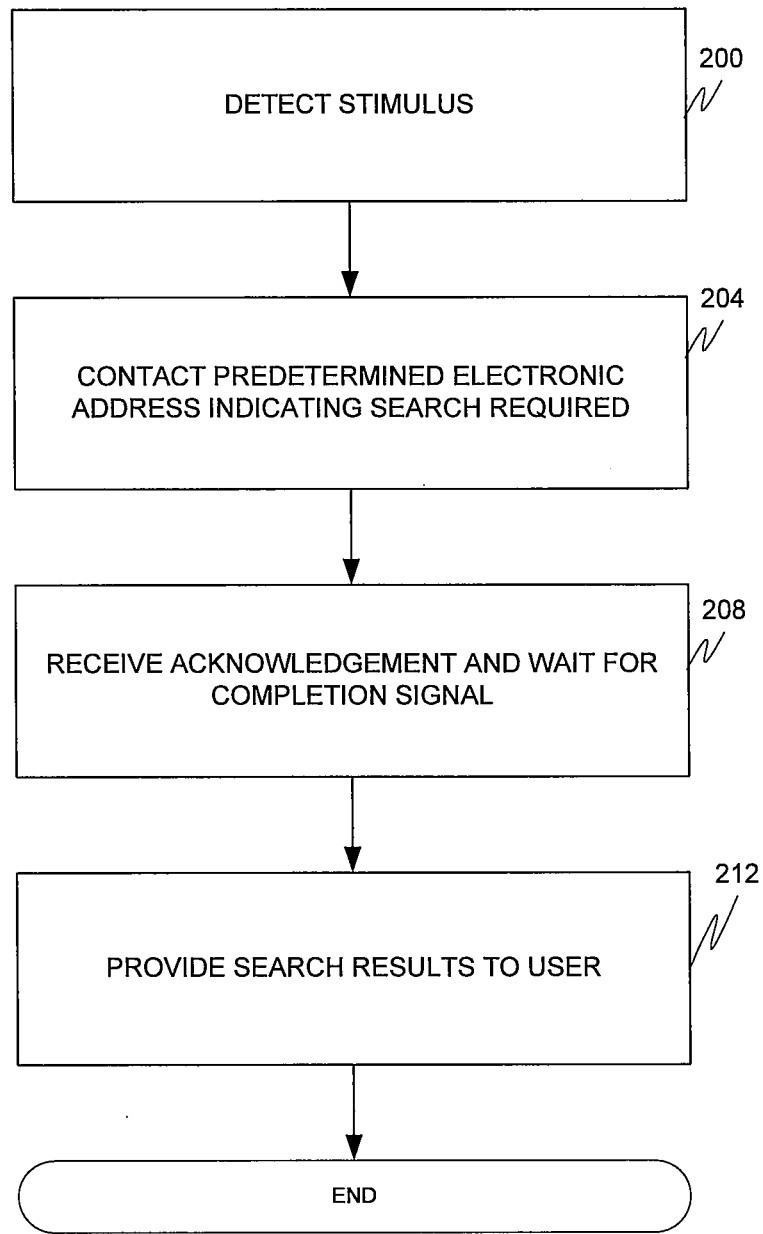
FIG. 2 depicts a flow chart according to an embodiment.
Figure 3B:
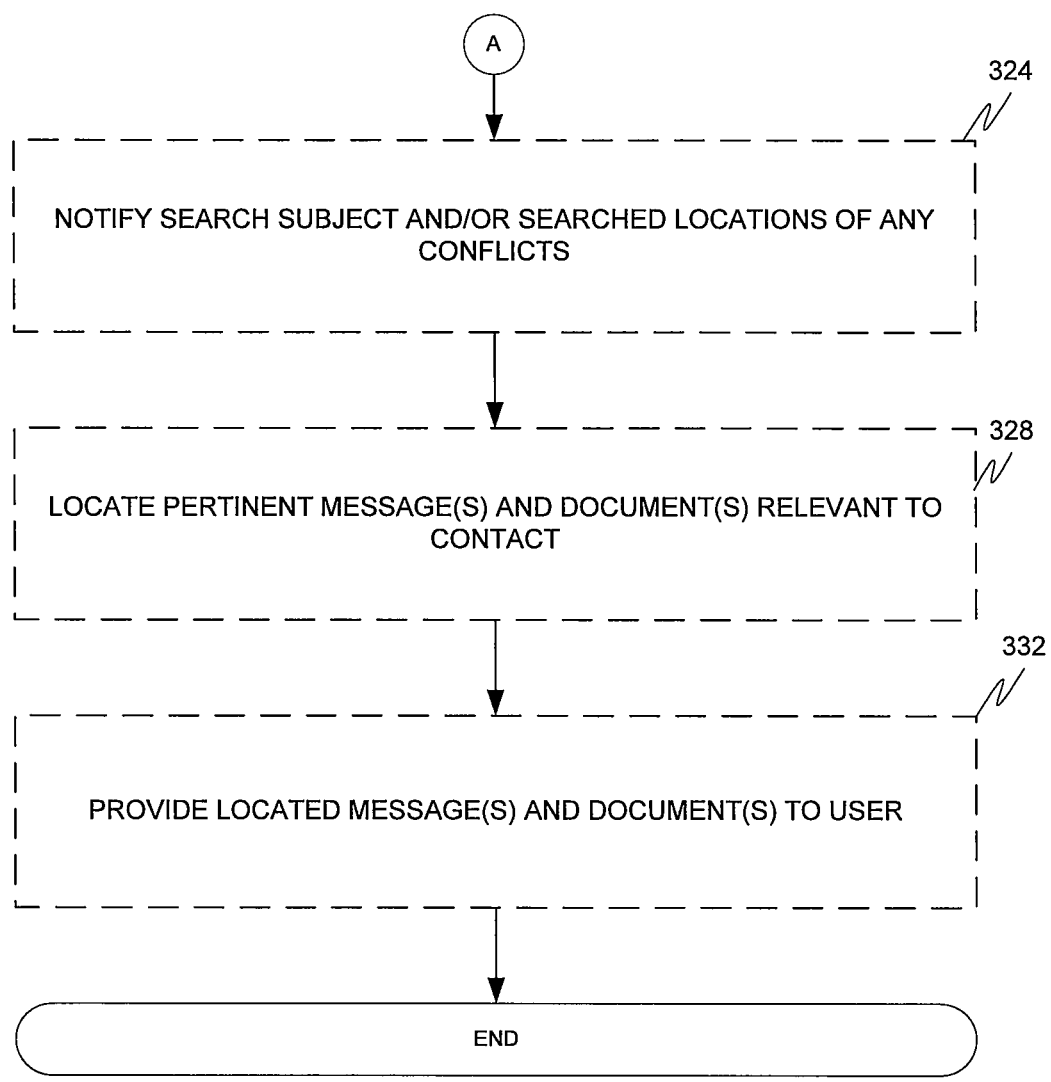

In step 212 of FIG. 2, the user's corresponding communication device 156 and/or computer 152 receives the completed search results and provides the completed search results to the user by the host communication device. In one configuration where multiple possible sets of search results are located, the corresponding communication device 156 or computer 152 provides the multiple search result alternatives to permit the user to select the appropriate result. The corresponding communication device 156 or computer 152 can locally store the results for future use, including updating local contact lists. The virtual assistant module 172 in any of the communication server 136, communication device 156, or computer 152 can maintain a database of search term(s)/result(s) associations to speed future searches.

In one configuration, the completed search results are not provided to the user by the communication device 156 but alternatively or additionally by the corresponding computer 152. For example, the search results may be presented entirely by the communication device 156, entirely by the computer 152, or partly by the communication device 156 and partly by the computer 152.

Returning to FIG. 3B, additional, optional steps can be performed by the virtual assistant module 172.

In optional step 324, the virtual assistant 172 and/or location service 120 notify the searched subject (e.g., third party), searching party (user), or searched location of any conflicts or updates identified during the search. For example, if the third party has incorrect information or conflicting on his or her social network profile, the virtual assistant 172 and/or location service 120 can generate and send a notification of the erroneous or conflicting information to the received third party's electronic address (that was used in the search) or another electronic address associated with the third party, to the user, and/or to the social network 124 of the third party.

In optional step 328, the virtual assistant 172 can locate pertinent messages stored by the messaging server(s) 140 and document(s) relevant to the incoming or outgoing contact. The messages can be heard or unheard voice messages, read or unread e-mails, read or unread instant messages, and the like. The document(s) may be documents recently edited by the user related to the third party. For example, if the third party is a client of the lawyer user the document may be a recently edited draft agreement relevant to a subject matter identifier identified in the search. When such messages or documents are located, a pop up on the communication device or computer would query the user whether outgoing contact set up is to be delayed or the incoming contact redirected to an automated attendant until the user has the opportunity to review the located messages or documents.

In optional step 332, the located messages and/or documents are presented to the user. This can be done by a pop up display on the user's communication device 156 or personal computer 152.

Figure 5:
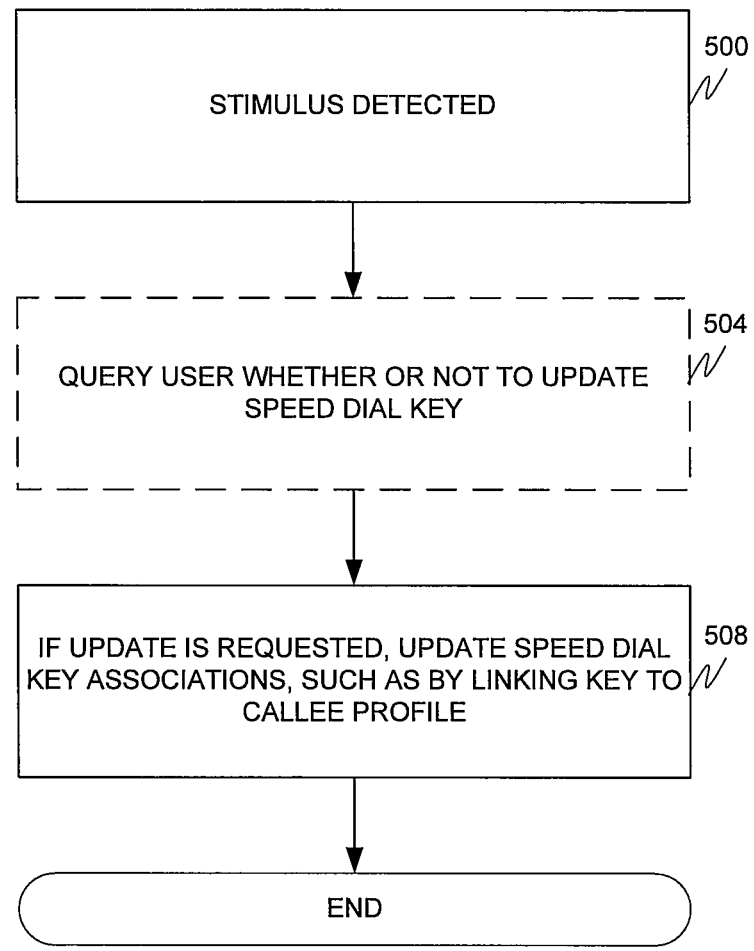
FIG. 5 is a flow chart according to an embodiment.

The operation of the key update module 168 will now be described with reference to FIG. 5.

In step 500, the key update module 168 detects a stimulus for updating speed dial key associations. The stimulus can be, for example, expiration or passage of a specified time period, realization, based on call logs 198, of at least a threshold calling frequency to a telephone number, realization, based on call logs 198, of less than a threshold frequency to a telephone number, and user input.

In optional step 504, the key update module 168 queries the user whether or not to update the speed dial key associations.

If an update is requested or confirmed by the user, the update module 168, in step 508, updates the speed dial key associations, such as by linking the key to a callee profile. The update is typically based upon call frequencies to selected telephone numbers (with more frequently called telephone numbers receiving an associated speed dial key) or user input.

In this manner, more frequently called business contacts (e.g., clients or customers) are on the speed dial key association listing. In one configuration, more frequently called numbers are at the head of the list and less frequently called number at the tail of the list. When a matter is over or concluded and a client is not being called nearly as often, the module 168 moves the client down the list and eventually removes the client from the speed dial list in favor of a client that is more current.

Figure 6:
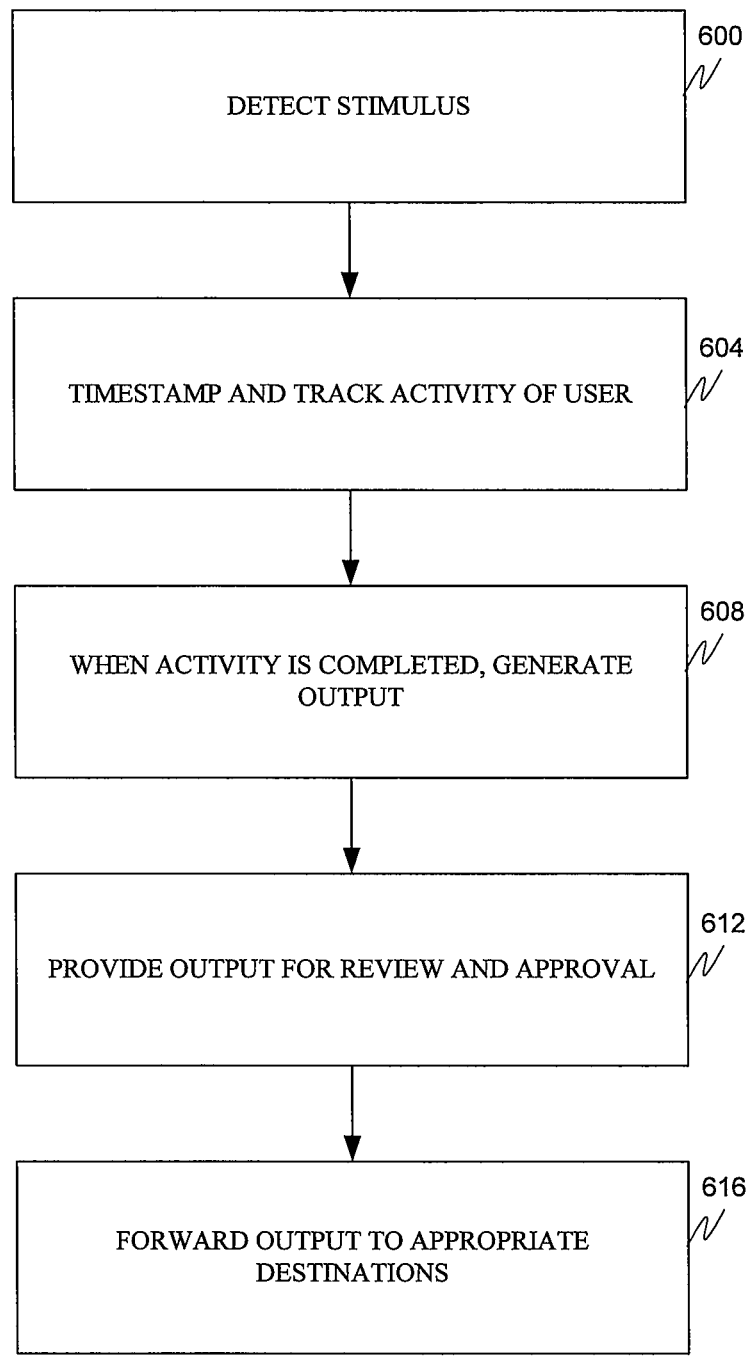
FIG. 6 is a flow chart according to an embodiment.

Another operation of the virtual assistant module 172 will now be discussed with reference to FIG. 6.

In step 600, the virtual assistant module 172 detects a stimulus. The stimulus may be a user request or a user contact-related activity such as placement or disconnection of an outbound phone call, receipt or disconnection of an inbound phone call, creation or completion (e.g., sending) of an email or instant message, opening and/or closing of an email, opening or closing of a file, document or other record, or any the occurrence of any other monitored or tracked activity discussed herein.

In step 604, the virtual assistant module 172 timestamps and tracks these and other activities of the user. This step can be performed in many ways.

One way for the virtual assistant module 172 to perform step 604 is to query or otherwise interact with the user, periodically or in response to a stimuli, and via voice, text or the like, what subject he or she is working on. A direct entry and/or drop-down section or other selection of predefined listings of subject identifiers can be provided to the user. By way of illustration, the virtual assistant module 172 can automatically log a phone call into the enterprise billing system 180 based on the contacted or contacting phone number. The phone can play an audio prompt via speaker phone or over a headset or handset via whisper page inquiring what is being worked on at that moment. The audio response is converted into text and logged into the billing system 180 along with a timestamp. Alternatively, the virtual assistant module 172 can generate a text message notification to an assistant or billing support person containing the length of the call, subject identifier, and optionally a user or automatically generated summary of what was discussed.

Another way for the virtual assistant module 172 to perform step 604 is to use automated monitoring and/or tracking of contextual work flow analysis and other user activities. For example, the virtual assistant module 172 can monitor and/or track, as a function of time and subject identifier, what files or directories are being accessed by the user, what e-mails are being prepared and sent (including the "to" and "subject matter" fields), what documents are being edited, what Internet searches are being performed, the user's keystrokes, voice or data monitoring to and/or from the user's communication device or computer, communication records involving the user, what URL's are being accessed by the user, the cursor activity of the user and cursor display location (what windows and window portions are being accessed by the cursor, pointing and selection commands such as those from a mouse, trackball, joystick, stylus, or other like device), application launch, and other like systems or activities to create an accurate record of what communication and/or search activities have been conducted.

In cases where there are multiple matters and subject identifiers for a single customer or client, the virtual assistant module 172 can use known methods to determine context and offer the user the best match, or alternatively offer the user some sort of matter listing via voice and/or text such that the user can select the correct subject identifier.

Timing information is generally determined by timestamping beginning (starting) and ending (stopping) points for the user activities. For example, the virtual assistant module 172 can timestamp call set up and disconnection to track session duration (e.g., phone call duration for phone calls), the initial and ending file edits to file folders, documents, or directories (e.g., duration of word processing session on a selected document), the opening of and sending of an e-mail or other communications, the initial and final instant messages in an instant messaging session, and other like starting and stopping points. Starting and stopping points can be identified by other techniques, such as by timestamping each relevant user action (e.g., each keystroke, command, instant message, and so on) and assuming that the time interval is over when no further user activity is detected on the subject identifier for a determined period of time. In that event, the last timestamped action is assumed to be the end of the relevant time interval. In other configurations, the virtual assistant module 172 uses other information, such as presence information from the presence service 112, real-time monitoring of user work flow, user location (via for example an RFID location system or satellite based coordinate system), and scheduled tasks from the personal information manager 148, to identify temporal starting and stopping points for billing purposes based on detected breaks, distractions, sudden changes to other matters, and the like. As will be appreciated, the step can be performed by a number of other ways, depending on the configuration and application.

Where an activity spans a long period of time, there may be multiple sets of starting and stopping points and multiple resulting time intervals. These time intervals can be recorded as separate billing events or summed to provide a single billing event for that business period (e.g., business day).

In step 608, the virtual assistant module 172 determines that the activity is completed and generates the output. The output can be in many forms. The outputs of the virtual assistant module 172 can, for example, be formatted directly for the billing system 180 and/or they can generate complete and/or byproduct output formatted using popular formats, such as Microsoft Word™, Microsoft Excel™, PDF, or any other like output.

In step 612, the output is provided, in oral, text, or other form, to the user, such as via computer or computational device, for review and approval. The user can edit the output and correct any errors or make other appropriate adjustments or changes.

In step 616, the output is forwarded, by the virtual assistant module 172, to one or more appropriate destinations. The monitored and/or tracked information can be integrated tightly with the billing system 180 (collected locally and formatted to send to the billing application) and/or sent to multiple parties in partial form based on what their interest or role is. The virtual assistant module 172 outputs can be linked directly to other systems and/or they can be forwarded by other communication modalities. The records may be paired with keyword summaries (discussed below), recordings (either in native coding or transcoded for reduced storage space and/or system compatibility) (discussed below), and/or other work product deriving content from the communications/search sessions.

The exemplary systems and methods of this invention have been described in relation to a telecommunication system. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a communication server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the invention is used with a digital or analog communication device of limited intelligence. In this alternative, the communication device lacks the intelligence for the type of bidirectional communications necessary to resolve the conflicts, and the search terms are sent to the corresponding computer where the user makes the same choices as would otherwise be available on the communication device.

In another alternative embodiment, the user contacts the location service 120 from an external network node that is not part of the internal or enterprise network 104. For example, the user could call into the location service 120 from a personal, public, or cellular phone and interact with an interactive response unit in the service 120. The search would orally be transmitted to the unit and the unit would orally provide the results to the user during the same or a subsequent call.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
monitoring, by a processor executable virtual assistant module and in substantial real time, a collection of actions by a user, wherein the at least one of the collection of actions is a search for a third party and wherein the third party is a person;
determining, from a profile, a trusted relationship between the third party and an other person;
in response to determining the trusted relationship, automatically contacting the other person to request information about the third party;
receiving, from the other person, a response containing the information about the third party;
based on the monitoring step, determining, by the processor executable virtual assistant module, a subject identifier associated with the monitored actions; and
generating, by the processor executable virtual assistant module, at least part of a billing entry based on the subject identifier, the information about the third party, and the monitored actions.

2. The method of claim 1, wherein the collection of actions monitored by the user is a contact by the user with the third party and further comprising:
determining, by the processor executable virtual assistant module, at least one of a contact address of the third party and caller identification of the third party;
determining, by the processor executable virtual assistant module, the subject identifier based on the at least one of a contact address and caller identification of the third party.

3. The method of claim 1, wherein the collection of actions further comprise a voice session between at least the user and the third party and wherein the monitoring step comprises:
while the voice session is in progress, receiving, by the processor executable virtual assistant module, at least one of the voice streams exchanged between the user and third party;
while the voice session is in progress, converting, by the processor executable virtual assistant module, the at least one of the voice streams into a text equivalent; and
while the voice session is in progress, parsing, by the processor executable virtual assistant module, the text equivalent for at least one keyword, wherein the generating step is based on a result of the textual parsing.

4. The method of claim 1, wherein the determining step comprises providing to the user a list of possible subject identifiers and receiving a user selection of the appropriate subject identifier on the list.

5. The method of claim 1, wherein the monitored collection of actions further comprise a billable search and wherein the billing entry comprises the subject identifier and a description of the search.

6. The method of claim 1, wherein the monitored collection of actions further comprise one or more of placement or disconnection of an outbound phone call, receipt or disconnection of an inbound phone call, creation or completion (e.g., sending) of an email or instant message, opening and closing of an email, opening or closing of a file, document or other record and wherein the virtual assistant module timestamps starting and stopping points associated with the determined subject identifier and includes a time interval between the starting and stopping points in the billing entry.

7. The method of claim 6, wherein the starting point is one or more of call set up, initial file edit, opening of an e-mail, and initial message sent, wherein the stopping point is one or more of call disconnection, final file edit, closing of an e-mail, and final message sent.

8. The method of claim 6, wherein at least one of the starting and stopping points is determined by detected presence or physical location of the user and/or an electronic calendar entry.

9. A non-transient computer readable medium comprising processor executable instruction for performing the steps of claim 1.

10. A system, comprising:
a processor executable virtual assistant module operable to:
monitor, in substantial real time, a collection of actions by a user, wherein the at least one of the collection of actions is a search for a third party and wherein the third party is a person;
determine, from a profile, a trusted relationship between the third party and an other person;
in response to determining the trusted relationship, automatically contact the other person to request information about the third party;
receive, from the other person, a response containing the information about the third party;
based on the monitoring step, determine a subject identifier associated with the monitored actions; and
generate at least part of a billing entry based on the subject identifier, the information about the third party, and the monitored actions.

11. The system of claim 10, wherein the collection of actions monitored by the user further comprise a contact by the user with the third party and further comprising:
determining, by the processor executable virtual assistant module, at least one of a contact address of the third party and caller identification of the third party;
determining, by the processor executable virtual assistant module, the subject identifier based on the at least one of a contact address and caller identification of the third party.

12. The system of claim 10, wherein the collection of actions further comprise a voice session between at least the user and the third party and wherein the monitoring step comprises:
while the voice session is in progress, receiving, by the processor executable virtual assistant module, at least one of the voice streams exchanged between the user and third party;
while the voice session is in progress, converting, by the processor executable virtual assistant module, the at least one of the voice streams into a text equivalent; and
while the voice session is in progress, parsing, by the processor executable virtual assistant module, the text equivalent for at least one keyword, wherein the generating step is based on a result of the textual parsing.

13. The system of claim 10, wherein the determining step comprises providing to the user a list of possible subject identifiers and receiving a user selection of the appropriate subject identifier on the list.

14. The system of claim 10, wherein the at least part of the billing entry comprises the subject identifier and a time duration of services to be billed to the third party.

15. The system of claim 14, wherein the at least part of the billing entry comprises a description of the services provided by the user.

16. The system of claim 10, wherein the monitored collection of actions further comprise a billable search and wherein the billing entry comprises the subject identifier and a description of the search.

17. The system of claim 10, wherein the monitored collection of actions further comprise one or more of placement or disconnection of an outbound phone call, receipt or disconnection of an inbound phone call, creation or completion (e.g., sending) of an email or instant message, opening and closing of an email, opening or closing of a file, document or other record and wherein the virtual assistant module timestamps starting and stopping points associated with the determined subject identifier and includes a time interval between the starting and stopping points in the billing entry.

18. The system of claim 17, wherein the starting point is one or more of call set up, initial file edit, opening of an e-mail, and initial message sent, wherein the stopping point is one or more of call disconnection, final file edit, closing of an e-mail, and final message sent.

19. The system of claim 17, wherein at least one of the starting and stopping points is determined by detected presence or physical location of the user and/or an electronic calendar entry.

20. The method of claim 1, further comprising:
locating a message stored on a messaging server relevant to an incoming or outgoing contact, wherein the message is an unread email, an unheard voice message, or an unread instant message; and
querying the user if the user wants to display or review the message.

21. The method of claim 20, wherein the incoming or outbound contact is an outbound contact and further comprising:
identifying, by the virtual assistant module, a display segment for the third party to contact, wherein the display segment comprises a calendar item of an event scheduled to occur; and
displaying the display segment to the third party.

22. A method, comprising:
monitoring, by a processor executable virtual assistant module and in substantial real time, a collection of actions by a user, wherein the at least one of the collection of actions is a search for a third party and wherein the third party is a person;
determining, from a profile, a trusted relationship between the third party and an other person;
in response to determining the trusted relationship, automatically contacting the other person to request information about the third party;
receiving, from the other person, a response containing the information about the third party;
determining that the information about the third party has conflicting information;
notifying the third party of the conflicting information;
based on the monitoring step, determining, by the processor executable virtual assistant module, a subject identifier associated with the monitored actions; and
generating, by the processor executable virtual assistant module, at least part of a billing entry based on the subject identifier, the information about the third party, and the monitored actions.

* * * * *